(12) United States Patent
Graf et al.

(10) Patent No.: US 6,287,237 B1
(45) Date of Patent: Sep. 11, 2001

(54) METHOD OF CONTROLLING THE DRIVE TRAIN OF A MOTOR VEHICLE AND DRIVE TRAIN CONTROLLER OF A MOTOR VEHICLE

(75) Inventors: Friedrich Graf, Regensburg; Gregor Probst, Landshut; Florian Gutknecht-Stöhr, Regensburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/549,105

(22) Filed: Apr. 12, 2000

(30) Foreign Application Priority Data

Apr. 13, 1999 (DE) .............................. 199 16 637

(51) Int. Cl.⁷ .......................... B60K 41/20; B60K 41/04; F16H 61/00
(52) U.S. Cl. .............................. 477/94; 477/107; 477/118
(58) Field of Search .............................. 477/94, 107, 118, 477/183

(56) References Cited

U.S. PATENT DOCUMENTS

| 5,366,425 | * | 11/1994 | Kusaka et al. | ...................... | 477/118 |
| 5,514,050 | | 5/1996 | Bäuerle et al. . | | |
| 5,542,754 | * | 8/1996 | Aoki et al. | ...................... | 477/94 X |
| 5,613,743 | | 3/1997 | Kost et al. . | | |
| 5,618,243 | * | 4/1997 | Kondo et al. | ...................... | 477/118 |
| 5,746,679 | * | 5/1998 | Minowa et al. | ...................... | 477/107 X |
| 5,885,187 | * | 3/1999 | Tabata | ...................... | 477/107 |
| 5,957,990 | | 9/1999 | Graf et al. . | | |
| 6,009,365 | * | 12/1999 | Takahara et al. | ...................... | 477/118 X |
| 6,106,434 | * | 8/2000 | Ibamoto et al. | ...................... | 477/118 X |

FOREIGN PATENT DOCUMENTS

| 42 30 101 A1 | 3/1994 | (DE) . |
| 43 30 391 A1 | 10/1994 | (DE) . |
| 196 37 210 A1 | 3/1998 | (DE) . |
| 406001166 | * 1/1994 | (JP) ...................................... 477/107 |

OTHER PUBLICATIONS

Published International Application No. PCT/DE96/01028 (Graf et al.), dated Jun. 12, 1996, as mentioned on p. 2 of the specification.

* cited by examiner

Primary Examiner—Charles A Marmor
Assistant Examiner—Roger Pang
(74) Attorney, Agent, or Firm—Herbert L. Lerner; Laurence A. Greenberg; Werner H. Stemer

(57) ABSTRACT

A brake signal which is triggered by the driver by activating the brake pedal is converted into a required braking torque. A setpoint value for the engine drag torque is determined on the basis of the braking torque. The transmission ratio of an automatic transmission is defined automatically as a function of the setpoint value for the engine drag torque by reference to a down-shift characteristic diagram. The characteristic curves of the diagram are defined with reference to the minimum engine torque.

10 Claims, 3 Drawing Sheets

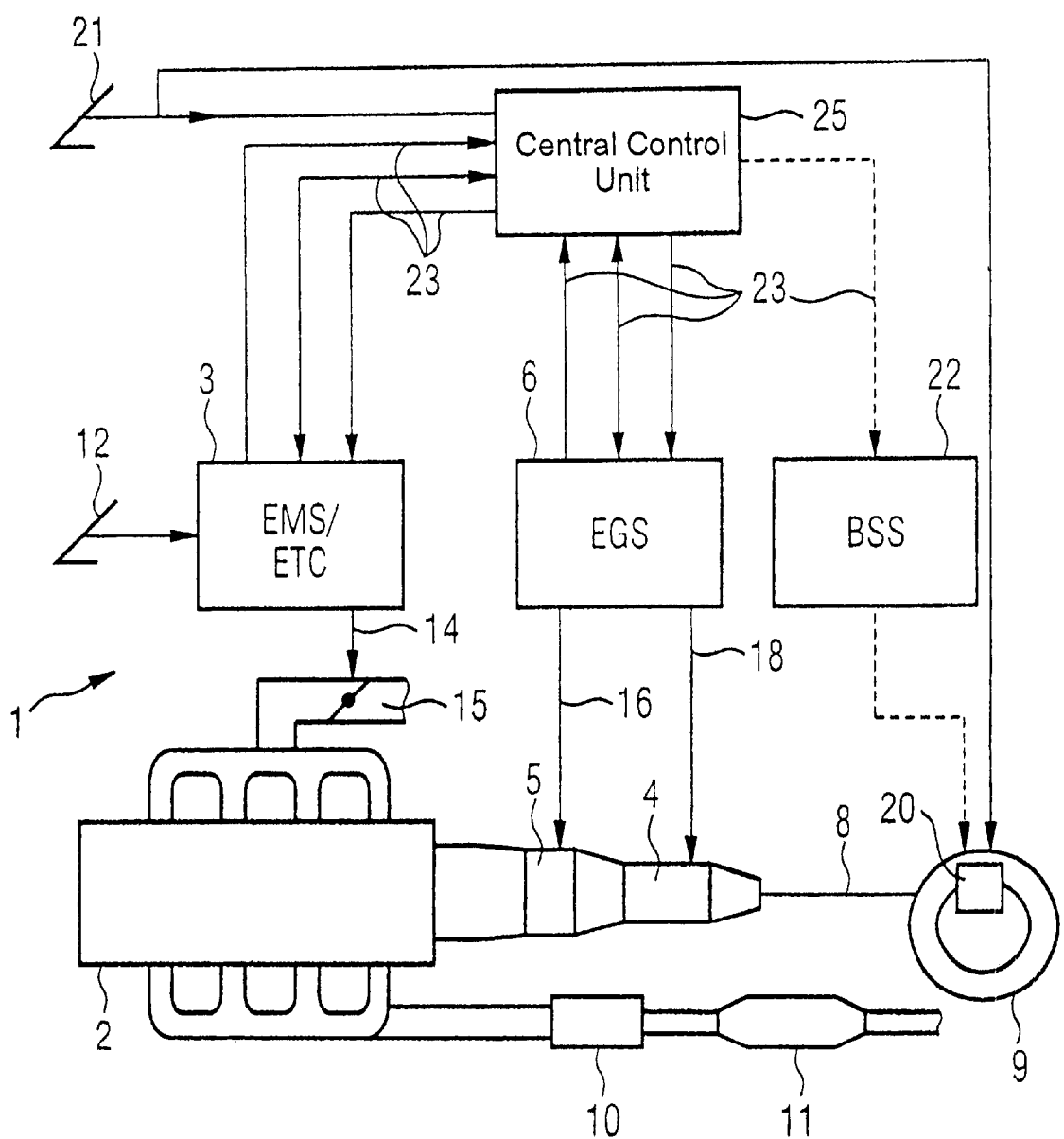

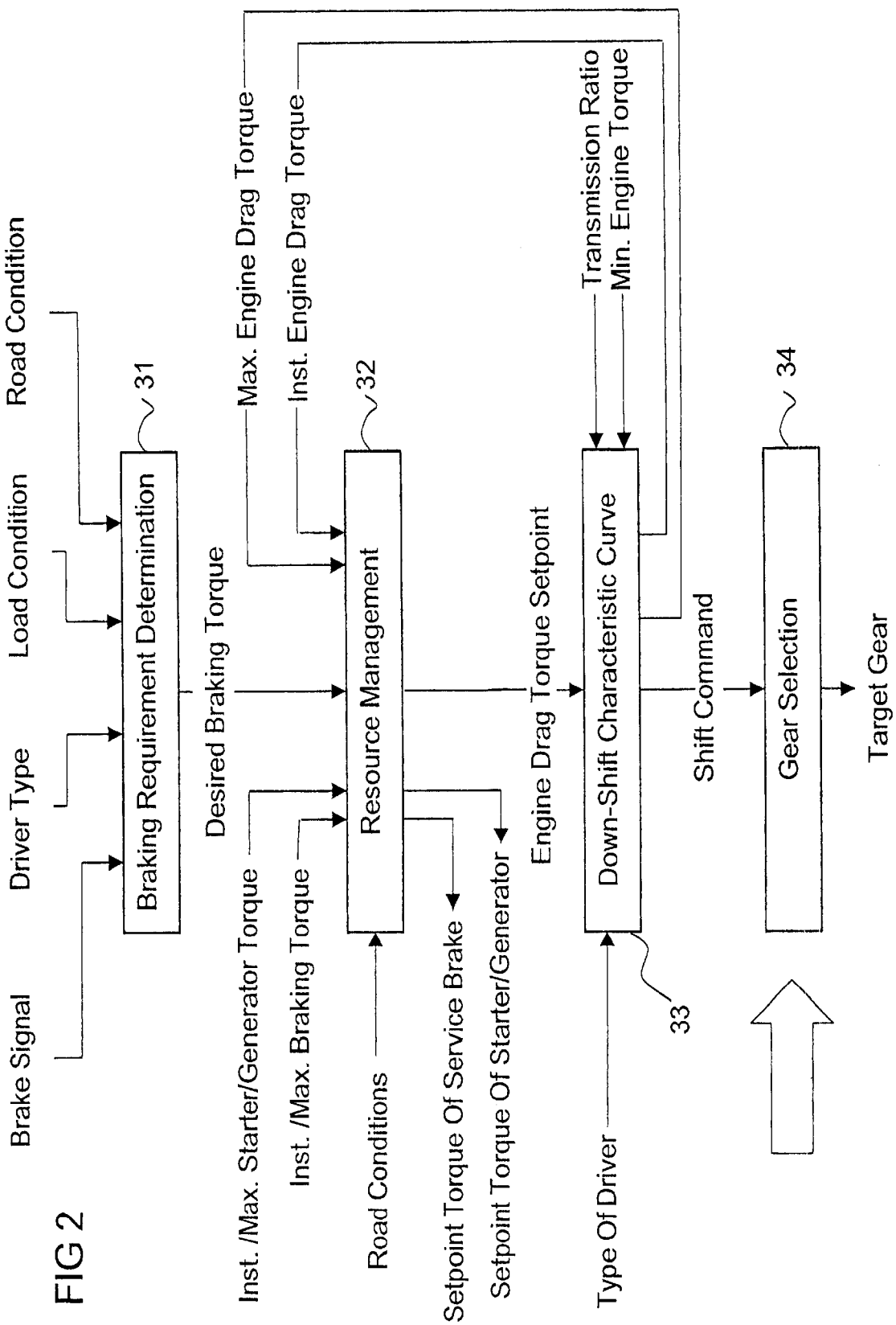

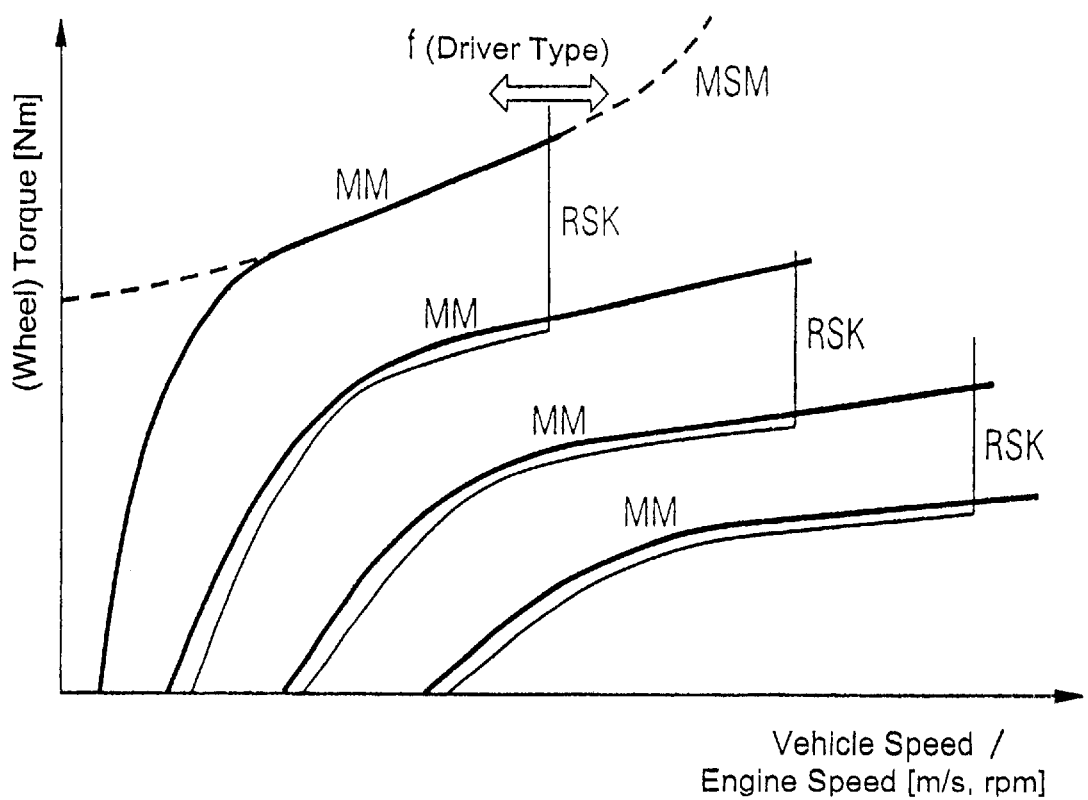

METHOD OF CONTROLLING THE DRIVE TRAIN OF A MOTOR VEHICLE AND DRIVE TRAIN CONTROLLER OF A MOTOR VEHICLE

BACKGROUND OF THE INVENTION

Field of the Invention

The invention lies in the automotive technology field. More specifically, the invention relates to a method and a control configuration for controlling the drive train of a motor vehicle. Such a drive train controller includes, on the one hand, an engine and an engine controller by means of which variables which influence the engine torque, for example the ignition timing and the metering of fuel to the cylinders, are controlled. On the other hand, it also includes an automatic transmission and a transmission controller by means of which shifting operations of the automatic transmission are controlled.

In prior art transmission controllers for motor vehicles, the transmission ratio of the transmission is set automatically in dependence on the position of the gas pedal and of the driving velocity by reference to stored characteristic diagrams. Instead of the position of the gas pedal in the narrower sense, it is also possible to use the signal of a so-called electronic accelerator pedal (E-Gas) or a different variable derived from the engine torque which the driver requests. In this context, various driving parameters and operating conditions of the motor vehicle are taken into account. See, for example, U.S. Pat. No. 5,957,990 (international publication WO 97/01051). The gear speed which is to be respectively engaged or—in the case of infinitely variable transmissions—the transmission ratio which is to be set is selected by control switching operations which operate, for example, using the methods of fuzzy logic. With this logic, the knowledge of experts which has been acquired through experience is described in the form of a so-called rule base and is thus used for the closed-loop or open-loop control operations of the motor vehicle transmission. The logic circuit generates control signals with which, inter alia, the transmission ratio of the transmission is defined.

A prior art integrated drive train controller for a motor vehicle interprets the position of the gas pedal and the brake pedal as a wheel torque which is required by the driver. See U.S. Pat. No. (Ser. No. 08/937,253) and German published patent application DE 196 37 210 A1. It has a calculation device by means of which the positions of the gas pedal and of the brake pedal are received and from which central control parameters for the drive sources and the decelerating units of the drive train are generated.

It is known to generate the setpoint braking torques intended for the drive wheels of a vehicle by means of engine braking torques and operating braking torques. See U.S. Pat. No. 5,613,743 and German published patent application DE 42 30 101 A1.

Furthermore, U.S. Pat. No. 5,514,050 (German published patent application DE 43 30 391 A1) discloses a method for controlling a drive train of a motor vehicle in which a brake signal that is triggered by the driver by activating the brake pedal generates an engine braking torque as a function of the braking effect by shifting down the automatic transmission. The engine braking torque can be metered here either constantly or variably in accordance with a characteristic curve.

There exist driving situations in which an activation of the brakes by the driver should expediently be supported by the drive train of the motor vehicle.

SUMMARY OF THE INVENTION

The object of the invention is to provide a method of controlling the drive train of a motor vehicle and a drive train controller which overcome the above-noted deficiencies and disadvantages of the prior alert devices and methods of this kind, and which detect a braking requirement by the driver and effectively support the required braking effect by controlling the transmission ratio of the automatic transmission.

With the above and other objects in view there is provided, in accordance with the invention, a method of controlling a drive train of a motor vehicle, which comprises:

converting a brake signal issued via a brake pedal of a motor vehicle into a required braking torque;

determining a setpoint value for an engine drag torque based on the required braking torque; and providing a down-shift characteristic diagram from which a setpoint transmission ratio to be set can be determined as a function of the setpoint value for the engine drag torque and of a variable functionally associated with a speed of the motor vehicle, and having characteristic curves defined by taking into account a minimum engine torque; and automatically setting a transmission ratio of an automatic transmission of the motor vehicle by reference to the down-shift characteristic diagram.

In accordance with an added feature of the invention, the converting step comprises converting the brake signal into a required braking torque as a function of various operating parameters of the motor vehicle.

In accordance with an additional feature of the invention, the down-shift characteristic diagram includes the transmission ratio of the transmission as a function of a variable associated functionally with the wheel torque and a variable associated functionally with the speed of the vehicle.

In accordance with another feature of the invention, the characteristic curves of the down-shift characteristic diagram are defined with reference to a maximum desired rotational speed after a shifting-down operation.

In accordance with a further feature of the invention, a lower limit for permissible shifting-down operations is included in the down-shift characteristic diagram.

In accordance with again an added feature of the invention, the transmission ratio is adaptively determined with reference to a driving style and a driving situation.

In accordance with again an additional feature of the invention, setpoint values for the torque are determined on a basis of the required braking torque, for all electronically controllable braking assemblies present in the motor vehicle.

In accordance with again a further feature of the invention, the required braking torque is distributed among the electronically controllable braking assemblies present in the motor vehicle as a function of various operating parameters of the motor vehicle.

With the above and other objects in view there is also provided, in accordance with the invention, a drive train controller of a motor vehicle having an engine and an automatic transmission, comprising:

an engine controller for controlling variables adapted to influence an engine torque;

a transmission controller for controlling a transmission ratio of an automatic transmission of the motor vehicle;

a central control unit connected to the engine controller and to the transmission controller, the central control unit being programmed to:

convert an activation of a brake pedal of the motor vehicle into a required braking torque;

determine a setpoint value for the engine drag torque based on the required braking torque; and define the transmission ratio of the automatic transmission in dependence on the setpoint value for the engine drag torque by reference to a down-shift characteristic diagram.

In accordance with a concomitant feature of the invention, the motor vehicle has a plurality of electronically controlled braking assemblies each connected to and controlled by the central control unit.

In summary, according to the invention, activations of the brake pedal by the driver are interpreted as a requirement for braking torque. The gear speed selection is then made using torque-based shifting-down characteristic curves. The engine characteristic can be transmitted with significant variables from the engine controller to the transmission controller in compressed form, i.e. with a very small amount of data, in order to decouple the two systems as much as possible. The shifting-down characteristic curves are defined as independently of the engine as possible and in particular do not contain a torque model of the engine.

The engine characteristic is concentrated on the interface between the transmission and the engine. The shifting-down characteristic curves can thus be defined to a large extent independently of the engine. This obviates the necessity to adapt them individually to different engine types. In view of the large number of options for a motor vehicle—the so-called uniform platform with different engine and transmission equipment—which are already found today and are expected to increase in future, this leads to a significant reduction in the development outlay on the drive train controller.

Other features which are considered as characteristic for the invention are set forth in the appended claims.

Although the invention is illustrated and described herein as embodied in a method for controlling the drive train of a motor vehicle and drive train controller of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic diagram of a drive train of a motor vehicle having a drive train controller according to the invention;

FIG. 2 is a flowchart explaining the method according to the invention; and

FIG. 3 is a torque-based shifting-down characteristic diagram.

DESCRIPTION OF THE PREFERRED EMBODIMENTS

Referring now to the figures of the drawing in detail and first, particularly, to the schematic illustration of FIG. 1, there is seen a drive train 1 of a motor vehicle that includes: an engine 2 with an electronic engine controller 3 which can also perform the function of an electronic throttle valve regulator ETC, an automatic transmission 4 with a torque converter 5, and an electronic transmission controller 6. In the exemplary embodiment, the transmission is embodied as a hydraulic planetary gear mechanism with a converter lock-up clutch. A controller according to the invention can, however, be used equally well for other automatic transmissions such as automated manual shift transmissions or infinitely variable transmissions (CVT, IVT). The wheel drive is indicated by a cardan shaft 8 and a driven wheel 9. The exhaust system is indicated with a catalytic converter 10 and a silencing muffler 11.

A gas pedal 12 conveys the driver's requirements to the engine controller 3, which for its part accordingly controls the engine. This is indicated by a signal line 14 via which a throttle valve 15 is adjusted. The controller of the injection time and of the fuel quantity injected into the motor are not illustrated because they are generally known.

The transmission controller 6 controls, via a signal line 16, a non-illustrated lock-up clutch—or dry clutch in the case of automated manual shift transmissions—for the torque converter 5, and controls the transmission ratio of the transmission 4 via a signal line 18. A brake actuator 20 is connected either directly, for example via a hydraulic line, to a brake pedal 21 or, in the case of an electronically controlled service brake (brake-by-wire) it is controlled by means of a brake controller 22 which may include an ABS system and a traction controller and a driving stability controller. The brake pedal 21 conveys the driver's braking requirements to a central control unit 25. The engine controller 3, the transmission controller 6 and the optional brake controller 22 are connected to the central control unit 25 via signal lines 23—unidirectional or bidirectional ones, for example in the form of a databus—which ensure coordination between the individual control units 3, 6, and 22. By means of the signal lines, information relating to operating variables of the motor vehicle and control signals, in particular in the form of physical description variables, is exchanged. The central control unit 25 carries out a coordinated calculation of the central operating parameters of the entire drive train on the basis of these data. This permits comprehensive control of the engine, transmission and, if appropriate, of the service brake.

The exchange of data in the form of physical description variables between the individual control units takes place, for example, in a torque-based fashion. The term "torque-based" is to be understood as follows: if, say, a reduction in the engine torque is required by the transmission, the required engine torque, and not: for example a required ignition angle adjustment, is transmitted directly to the central control unit.

In the exemplary embodiment, all the control units and assemblies which are to be controlled are illustrated as separate hardware units. However, the control units can also be combined, as so-called on-site units, with the assembly which is to be respectively controlled, or can be integrated into the assembly. Thus, in the case of an electric brake actuator, it is, for example, appropriate to combine the brake controller with the brake actuator. Likewise, the functionality of the central control unit can be integrated into one of the control units. This does not change anything in terms of the control function.

The drive train of a motor vehicle is known to be controlled in such a way that the transmission ratio of the automatic transmission is defined automatically as a function usually of the position of the gas pedal and the velocity of the motor vehicle by reference to characteristic diagrams which are stored in the transmission controller. At the same time, it is also possible to take into account various driving conditions or the load condition of the motor vehicle.

According to the present invention, the central control unit evaluates or analyzes a braking torque requirement or vehicle deceleration requirement of the driver of the motor vehicle—which is expressed by activating the brake pedal—and changes the transmission ratio. That change is supported by the braking effect of the brake system.

The method for controlling the drive train of a motor vehicle and the method of operation of the associated controller will now be explained in detail with reference to FIGS. 2 and 3:

In a block or stage 31 "determine braking requirement", a required braking torque, for example in the form of a negative wheel torque or else as a setpoint wheel circumferential force or setpoint transmission output torque, is determined on the basis of a brake signal. Either the output signal of a pedal value signal transmitter or braking force simulator serves here as the brake signal, permitting direct conversion of a brake pedal actuation into a required vehicle deceleration. Such pedal value signal transmitters or braking force simulators are used, in particular, in electronically controlled service brakes, generally referred to as brake-by-wire systems. As an alternative, the brake signal can, however, also originate from a simple switch on the brake pedal which merely signals the activation of the brake pedal. Such a switch is present in all known vehicles to control the brake lights. In that case, the required braking torque must be estimated from measured values of the deceleration of the vehicle and of the mass of the vehicle. When the required braking torque is determined in block 31, it is possible to take into account not only the brake signal but also further operating parameters such as the type of driver, the load condition, or the road conditions (for example winter mode). To do this, further input signals are necessary, for example the differential torque from the comparison of required current driving resistance and stored driving resistance characteristic curve to determine the load condition. Generally, the conversion of the brake pedal position into a wheel torque can be carried out with a fuzzy system which combines the multiple dependencies to form a setpoint wheel torque.

Depending on the type and number of usable, electronically controllable braking assemblies, the distribution of the required braking torque to the individual assemblies is defined in block 32 "resource administration" using suitable strategies. In addition to changing the transmission ratio of the transmission—referred to below also as drag torque braking—starters/generator motors which are also present in the drive train and electronically controlled service brakes (brake-by-wire) are used to decelerate the motor vehicle and are controlled by the central unit. In order to permit controlled distribution of the required braking torque to the electronically controllable brake assemblies which are present, the instantaneous and the maximum values of the starter/generator torque of the service braking torque and of the engine drag torque are respectively fed to the block 32. A wide variety of strategies are conceivable for the distribution of the required braking torque to the braking assemblies which are present. For example, when the brake pedal is activated by the driver, firstly only drag torque braking may be requested in order to utilize loss sources which are present in any case in a continuous drive train. In order to recover kinetic energy, it would also be necessary to brake using the starter/generator motor before the service brake. However, the absorption capacity of the battery must be taken into account here. Further operating parameters of the vehicle can also be taken into account in the management and distribution of resources. For example, when the road conditions are unfavorable it is possible to dispense with braking by means of the engine drag torque, which is difficult to regulate, or to restrict the functional scope of the braking because increasing the engine power, theoretically conceivable in order to reduce slip, would mean an additional expenditure of energy in this case.

In a block 33 "shifting-down characteristic curves" which will be explained in more detail with reference to FIG. 3, the necessity to intervene in the transmission in terms of the setpoint value for the engine drag torque determined by the resource administration is tested taking into account the type of driver, the instantaneous transmission ratio of the drive train and the value of the minimum engine torque, and if appropriate it is passed onto a block 34 "gear speed selection" by means of a shift command. Taking into account further influencing variables—indicated by the broad arrow—for example the instantaneous driving situation or the duration of the braking operation, the setting of a new target gear speed or of a new target transmission ratio is controlled in block 34. When the gradient of the braking requirement is high, it is advantageous, for example, to delay the outputting of a simple shifting-down instruction in order to achieve a significant braking effect by means of a double shifting-down operation (for example 5-3 shifting) taking into account the duration of the instantaneous braking operation and the deceleration of the vehicle which has already been brought about by more rapidly acting brake systems (for example the service brake). Such a function can be implemented in block 34 and is advantageously deactivated by means of the winter mode in order to avoid severe jumps in the wheel torque on a smooth underlying surface. The method of operation of a gear speed selection is otherwise generally known and is for this reason not explained in more detail here.

A possible embodiment of the down-shift characteristic curves is illustrated in FIG. 3. A variable which is functionally associated with the velocity of the vehicle, such as the output speed of the transmission, engine speed or velocity of the vehicle itself, is plotted on the abscissa of the diagram. The torque which is required by the driver is plotted in the form of a variable which is functionally associated with the wheel torque, such as transmission output torque, engine torque or negative wheel torque itself, on the ordinate of the characteristic diagram. When the throttle valve is closed, the engine has a predefined drag torque MSM (dashed line) which is dependent on the engine speed and which is limited at low engine speeds to comply with the idling engine speed value by the idling regulator to produce a minimum engine torque MM (thick solid lines). Four different transmission levels are illustrated in the figure. The actual number of gear speed levels may also be smaller (>1) and it is upwardly limited. Owing to the large jump in transmission ratio it is generally not desirable to permit shifting down into the first gear speed so that a lower limit for permissible shifting down operations is to be provided. This lower limit can also be defined as a function of the situation and can be displaced, for example in winter mode, to a higher gear speed in order to limit the maximum braking torque.

The object of the configuration of the shifting-down characteristic curves RSK is to represent the profile of the minimum engine torque MM as precisely as possible. In the process, a direct transfer of the standardized value in the engine controller, for example by transmitting data in the initialization phase, provides the greatest advantage when the system is used in a plurality of vehicle types. The characteristic curve from the engine controller is to be converted by including the transmission ratios of the transmission in the individual gear speeds and the tyre rolling circumference. The maximum required engine speed after shifting down must also be defined. In addition to the maximum speed permitted by the engine a threshold which is dependent on the type of driver can also be predefined in this respect. It is conceivable here, for example, to reduce the maximum engine speed in order to limit noise for comfort-oriented drivers. By increasing the characteristic curves vertically above the maximum required engine speed, shifting down is prevented at relatively high velocities or engine speeds.

The transmission ratio of the transmission is determined adaptively by selecting a suitable characteristic diagram as a function of the driving style of the respective driver and the driving condition of the motor vehicle, or a basic characteristic diagram is appropriately modified, for example displaced.

We claim:

1. A method of controlling a drive train of a motor vehicle, which comprises:
    converting a brake signal issued via a brake pedal of a motor vehicle into a required braking torque;
    determining a setpoint value for an engine drag torque based on the required braking torque; and
    providing a down-shift characteristic diagram
        from which a setpoint transmission ratio to be set can be determined as a function of the setpoint value for the engine drag torque and of a variable functionally associated with a speed of the motor vehicle, and
        having characteristic curves defined by taking into account a minimum engine torque; and
    automatically setting a transmission ratio of an automatic transmission of the motor vehicle by reference to the down-shift characteristic diagram.

2. The method according to claim 1, wherein the converting step comprises converting the brake signal into a required braking torque as a function of various operating parameters of the motor vehicle.

3. The method according to claim 1, wherein the down-shift characteristic diagram includes the transmission ratio of the transmission as a function of a variable associated functionally with the wheel torque and a variable associated functionally with the speed of the vehicle.

4. The method according to claim 1, which comprises defining the characteristic curves of the down-shift characteristic diagram with reference to a maximally desireable rotational speed after a shifting-down operation.

5. The method according to claim 1, which comprises including a lower limit for permissible shifting-down operations in the down-shift characteristic diagram.

6. The method according to claim 1, which comprises adaptively determining the transmission ratio with reference to a driving style and a driving situation.

7. The method according to claim 1, which comprises determining setpoint values for the torque on a basis of the required braking torque, for all electronically controllable braking assemblies present in the motor vehicle.

8. The method according to claim 7, which comprises distributing the required braking torque among the electronically controllable braking assemblies present in the motor vehicle as a function of various operating parameters of the motor vehicle.

9. A drive train controller of a motor vehicle having an engine and an automatic transmission, comprising:
    an engine controller for controlling variables adapted to influence an engine torque;
    a transmission controller for controlling a transmission ratio of an automatic transmission of the motor vehicle;
    a central control unit connected to said engine controller and to said transmission controller, said central control unit being programmed to:
        convert an activation of a brake pedal of the motor vehicle into a required braking torque;
        determine a setpoint value for the engine drag torque based on the required braking torque; and
        define the transmission ratio of the automatic transmission in dependence on the setpoint value for the engine drag torque by reference to a down-shift characteristic diagram.

10. The drive train controller according to claim 9, wherein the motor vehicle has a plurality of electronically controlled braking assemblies each connected to and controlled by said central control unit.

* * * * *